Nov. 9, 1948.    F. B. JACOB    2,453,576
SPOT WELD TESTER
Filed March 2, 1945    3 Sheets-Sheet 1
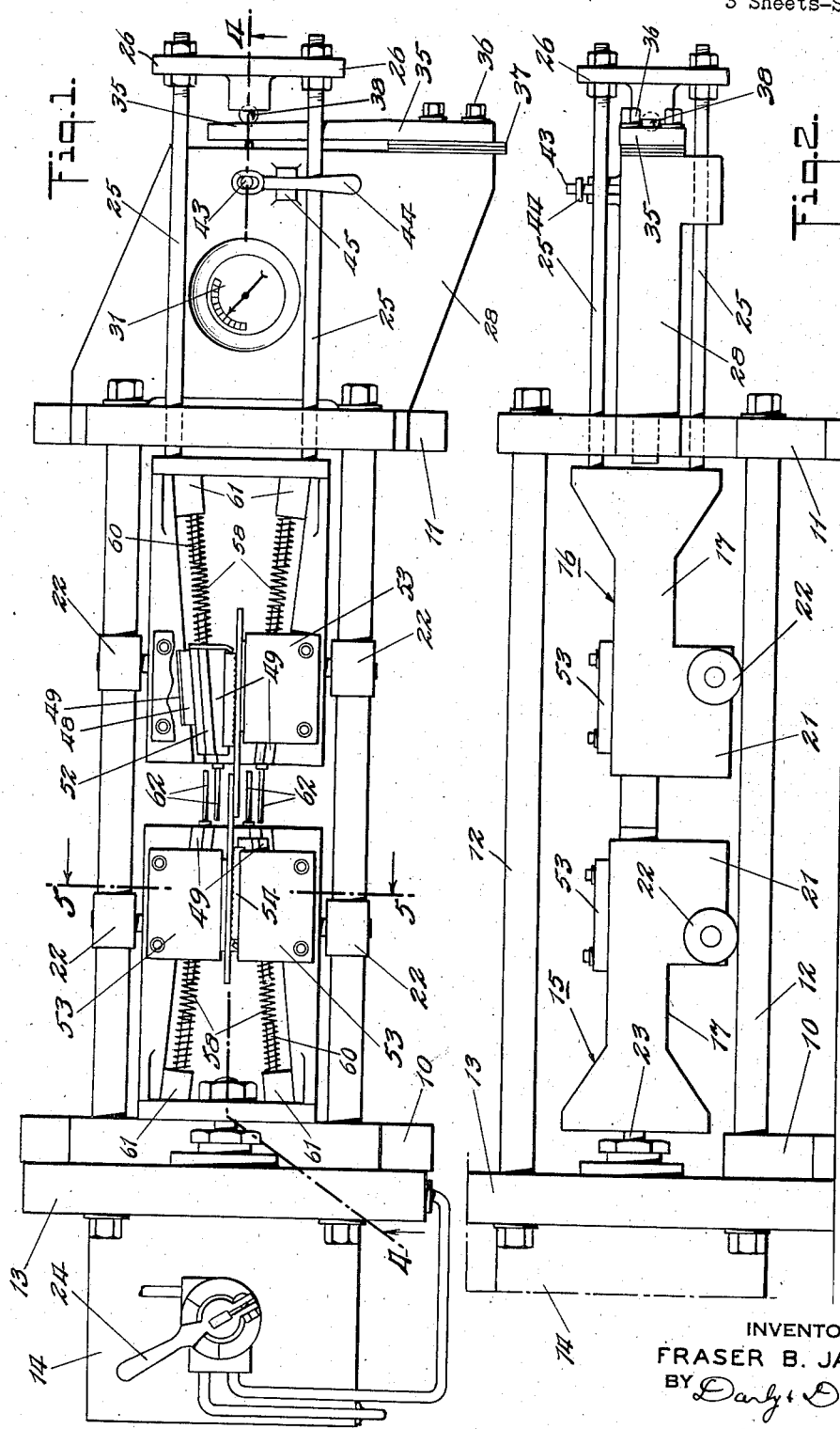
INVENTOR
FRASER B. JACOB
BY *Darby & Darby*
ATTORNEYS

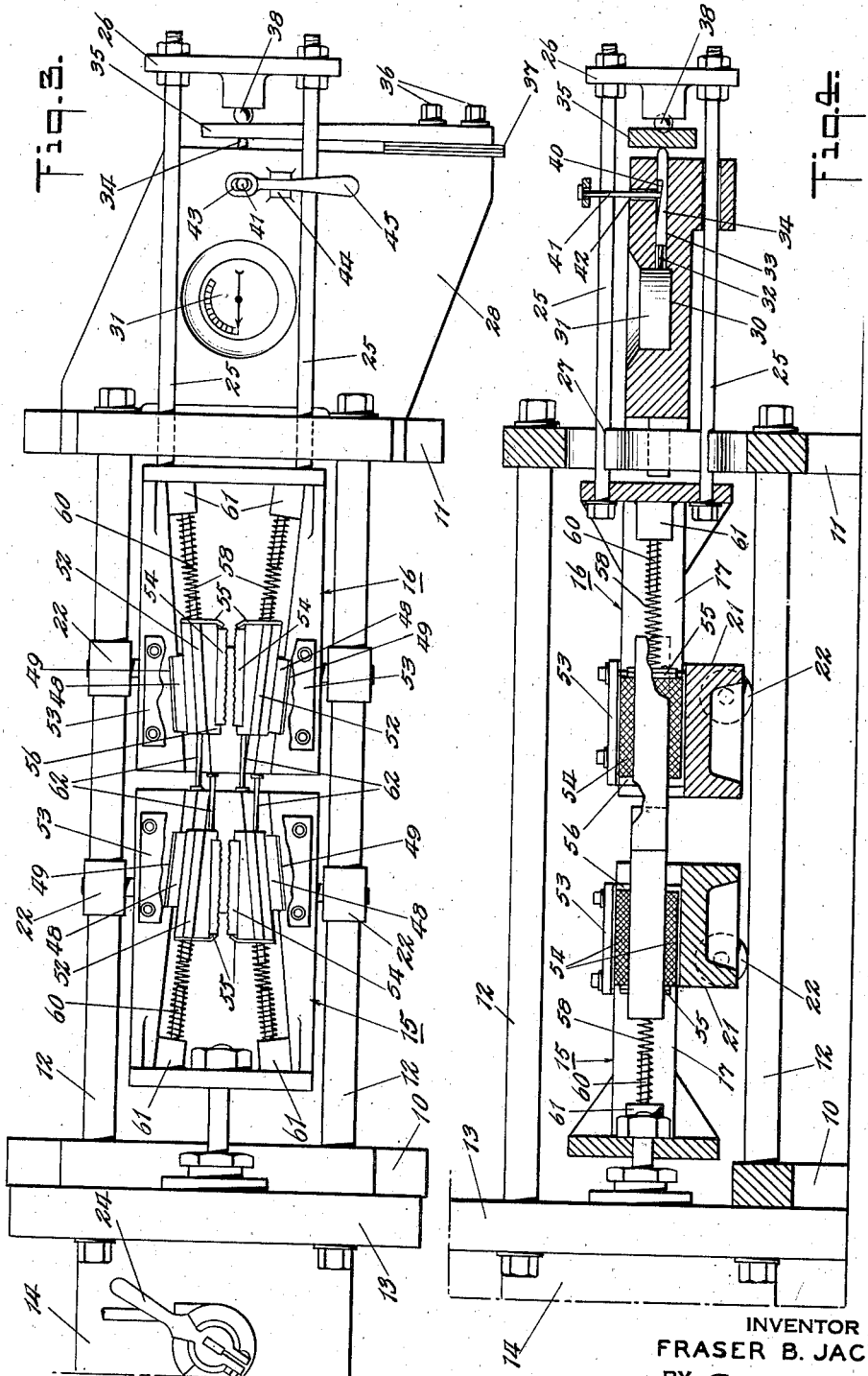

Nov. 9, 1948.　　　　　F. B. JACOB　　　　　2,453,576
SPOT WELD TESTER

Filed March 2, 1945　　　　　　　　　　　　　　3 Sheets-Sheet 3

INVENTOR
FRASER B. JACOB
BY Darby & Darby
ATTORNEYS

Patented Nov. 9, 1948

2,453,576

UNITED STATES PATENT OFFICE 2,453,576

SPOT WELD TESTER

Fraser B. Jacob, Lynn, Mass., assignor to The Electroloy Company, Incorporated, Bridgeport, Conn., a corporation of Connecticut Application March 2, 1945, Serial No. 580,565

1 Claim. (Cl. 73—88)

The present invention relates to a device for the testing of spot welds. In testing this type of weld it is customary to utilize a coupon which is simply two pieces of metal welded together by a single spot weld. A standard form of such coupon is made by spot welding two test strips of the metal in which the welds are to be made, each strip being approximately one inch wide and from four to six inches long, the test weld being made in the center of the one inch overlap of the strips. The coupon is then inserted in the testing device and the pressure, or, more exactly, the tension required to shear the weld apart is measured.

The present device comprises a pair of gripping heads one of which is mechanically connected to the piston of an air cylinder, and the other of which is connected to the measuring head. Each gripping head is provided with a pair of jaws for gripping the strips of the test coupon and the measuring head is connected to one of the gripping heads in such a manner that the movement of the head is opposed by the action of a spring and, therefore, the movement of the measuring head causes deflection of the spring, the amount of which is measured on a gauge calibrated in units of pressure, whereby the tension applied to the coupon is registered.

The gripping jaws are so designed as to be self-tightening and are provided with rubber inserts which cause the jaws to be self-equalizing thereby giving uniformity of grip and also permitting the material to follow the line of pull of the gripping heads. Furthermore, the jaws are so arranged that upon return movement of the air cylinder piston the jaws are automatically released and the ruptured coupon easily removed.

In addition, the gripping jaws are faced with pieces which are cut from ordinary double cut bastard files thereby providing a gripping surface which is efficient and easily and inexpensively replaced.

As has been indicated above, the measuring head comprises a flat steel spring which is fixed at one end and to the other end of which tension is applied through the gripping jaws and test coupon. Thus the application of the tension causes deflection of the free end of the spring which deflection is measured on an ordinary dial indicator gauge, the gauge, however, being calibrated in units of pressure ordinarily in pounds. For convenience in reading, a friction device is provided which retains the reading of the dial indicator gauge until it is manually released thus making it unnecessary to watch the gauge during the entire testing operation since the reading may be taken immediately prior to restoration of the gauge to its normal position.

It is an object of the invention to provide a spot weld coupon testing device having gripping jaws which are self-aligning and arranged to automatically grip the coupon.

It is a further object of the invention to provide such gripping jaws the gripping surface of which is comprised of readily available and inexpensively replaceable material such as pieces of bastard files.

It is a further object of the invention to provide such a spot weld coupon testing device in which a flat steel spring is the restraining force and the deflection thereof brought about by the measuring movement is read in units of pressure.

It is a further object of the invention to retain the reading of the indicator until such indicator is manually released.

It is a still further object of the invention to provide means for automatically releasing the gripping jaws of the device upon movement of the air cylinder piston or other power device to release position.

Other objects and features of the invention will be apparent when the following description is considered in connection with the attached drawings in which—

Figure 1 is a plan view of the spot weld coupon testing device of my invention;

Figure 2 is a side elevation of the device of Figure 1;

Figure 3 is a view similar to Figure 1 but showing the gripping jaws of the device in released position. In this figure certain portions have been broken away in order to more clearly illustrate the construction of the gripping jaws;

Figure 4 is a central, vertical, cross-section of the device, the section being taken on the plane of the line 4—4 of Figure 1;

Figure 5:
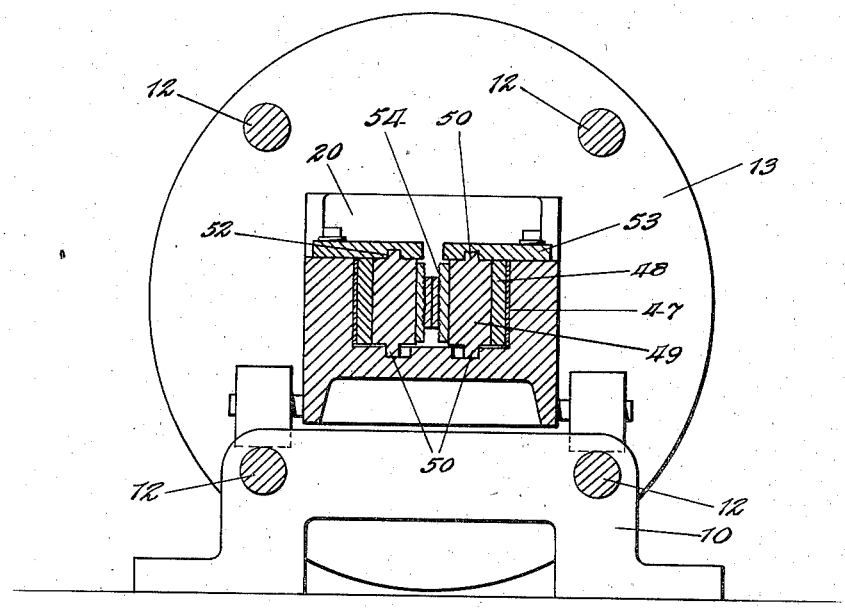
Figure 5 is a transverse vertical section of the device of Figure 1, the section being taken on the plane of the line 5—5 of Figure 1.

Referring now to the drawings, there are provided two castings 10 and 11 which are connected together to form a rigid structure by means of the four rods 12 and the flange 13 of the air cylinder 14.

Figure 6:
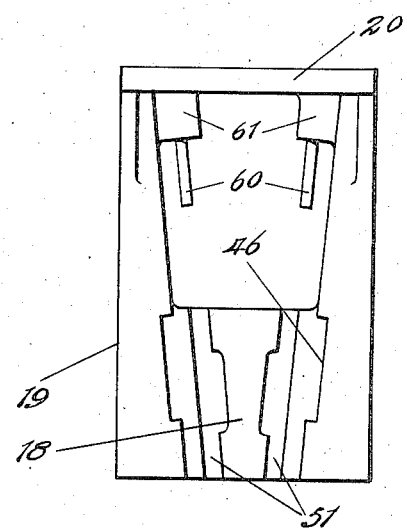
Figure 6 is a plan view of one of the gripping heads of the device with the parts constituting the gripping jaws removed.

Two gripping heads generally designated 15 and 16 are provided, these two heads being identical in construction and each comprising a casting 17 composed of a base portion 18 and a pair of upstanding walls 19 as well as an upstanding end plate 20. The walls 19, as is indicated particularly in Figure 6, are of increasing thickness and, therefore, the interior surfaces of the walls converge towards each other at the end of the gripping head opposite the plate 20. Each gripping head 15 and 16 is provided with a depending portion 21 and on each side of this depending portion there is provided a roller 22 which rolls along the upper surface of one of the two lower tie rods 12.

Gripping head 15 is fastened by any suitable means to the piston rod 23 of the air cylinder 14, which air cylinder is provided with a control valve and handle designated 24 by means of which air can be admitted to and exhausted from either side of the piston, not shown.

Gripping head 16 has fastened thereto four rods 25 which extend to the right, as seen in Figures 1 through 4, and are connected at their outer ends by means of a plate 26. These four rods 25 are supported in notched bearing surfaces such as those indicated at 27 formed in the casting 11. Fastened to the casting 11 is a plate 28 which extends to the right and is provided with a recess 30 in which the dial indicator gauge 31 is mounted with the plunger 32 of the indicator extending into a bore 33 formed in the plate 28. An auxiliary plunger 34 is also inserted in the bore 33, this plunger bearing against the plunger 32 at one end and against the flat, tapered steel spring 35 as the opposite end. The steel spring 35 is fastened to the plate 28 at its lower end, as seen in Figures 1 and 3, by means of the screws 36. The effective length of spring 35 may be varied by movement of the shim 37 inwardly and outwardly, as is clear by reference to Figure 3. Spring 35 and plate 26 are provided with hemispherical sockets facing one another, in which sockets a ball 38 is placed and by this means any movement of the gripping head 16 is transmitted through the rods 25 and plate 26 to the spring 35, which spring opposes such movement. The plunger 34 which has been above mentioned, rests against the spring 35 on the opposite side to ball 38 and thus any movement of the spring 35 causes movement of plunger 34 and likewise of the plunger 32 of the dial indicator gauge 31 and thereby causes a reading to appear upon the dial indicator gauge.

In order that any reading on the gauge may be retained, the plunger 34 is provided with a tapered notch 40 and the fiber faced end of a pin 41 rests against the surface of the notch 40. Pin 41 extends through a bore 42 in the plate 28 and is pivotally supported at its upper end in a slot 43 in release handle 44. Handle 44 is pivotally mounted in bosses 45 formed integrally with plate 28 and is held with its lower end, as seen in Figure 3, elevated by means of a spring, not shown. Thus pin 41 will normally bear against the notch 40 and will retain any reading set upon the indicator gauge 31. By depressing the lower end of handle 44, however, the plunger 34 is released from the frictional engagement of pin 41 and plunger 34 moves to the right under urge of the spring movement of the dial indicator gauge 31.

The details of the gripping jaws 15 and 16 can be best understood by reference to Figures 5 and 6 as well as Figures 1 and 2. As has been mentioned, the gripping heads comprise the converging surfaces of upstanding walls 19. Each of these walls is provided with a relieved portion 46 (see Figure 5) in which a piece of rubber 47 is inserted. In addition, a bearing member 48 rests in each such notch or relieved portion 46. Bearing against each bearing member 48 is a jaw 49 which jaw is in the form of a wedge one side of which is parallel to the converging face of the wall 19 and the other side of which is parallel to the center line of the gripping head. Jaws 49 are provided with ribs 50 on the upper and lower surfaces thereof, these ribs serving as guiding members, the lower rib cooperating with a groove 51 in the base portion 18 of the gripping head 15 or 16 as the case may be and the upper rib cooperating with a groove 52 in the associated cover plate 53. Fastened to the inner surface of each jaw member 49 is a piece of a bastard file 54 preferably a double cut bastard file. These pieces of file are fastened to the jaw members by means of lugs 55 and projections 56, the pieces of file being clamped between the projections 56 and the bent over ends of lugs 55, as is clearly shown in Figure 3. The lugs 55 are fastened to the ends of the jaws 49 by means of screws 57. In addition, the heads of the screws 57 are utilized to provide bearings for springs 58 one of which springs extends from each jaw 49 outwardly and generally parallel to the converging inner surface of the wall 19 of the particular gripping head and fits over a pin 60 formed integrally with the boss 61 of the gripping head considered. The springs 58 thus serve to force the jaws 49 together and to cause the coupon to be gripped between the pieces of bastard file 54 whenever gripping head 15 is moved to the left, as seen in Figure 2 for example.

Each gripping head 15 and 16 is provided with a pair of release pins 62 which bear against the adjacent jaw 49 of the other gripping head. Thus when the piston has been operated to its far right hand position all jaws 49 are forced outwardly against the pressure of springs 58 and the jaws are thereby moved apart and any coupon therein is released.

In operating the device, a coupon is placed with one end in the jaws of gripping head 15 and the other end in the jaws of gripping head 16 and, therefore, with the central portion bearing the weld to be tested lying between the jaws. The valve member 24 is then operated so that the piston rod 23 moves to the left. The initial movement of piston rod 23 and gripping head 15 towards the left permits springs 58 to force the jaws 49 and the gripping surfaces or bastard file portions 54 together to grip the two ends of the coupon. Following this, additional tension exerted upon the coupon tends to pull the jaws 49 inwardly relatively to the bearing surfaces or plates 48 and, therefore, to increase the grip of the jaws upon the coupon. Further, as the gripping head 15 moves to the left, head 16 moves with it until the weld under test shears. Consequently, during the interval prior to the shearing of the weld, plate 26 moves towards the left under urge of movement of gripping head 16 and deflection of spring 35 occurs, this deflection being transmitted through plungers 34 and 32 and registered upon the gauge 31. Once the weld is sheared no further movement of gripping head 16 occurs and, consequently, the reading upon the dial indicator 31 is a measure of the shearing stress exerted upon the weld at the instant of rupture thereof. As has been described, the reading of the gauge is retained until released by depression of the lower portion of handle 44 and, consequently, the valve 24 may be placed in its alternate position at any time following the rupture of the weld, it being only necessary to release the plunger 34 prior to a new testing operation.

Furthermore, movement of the gripping head 16 to its original position, that is most righthand position, as seen in Figures 1 through 4, will cause the pins 62 of the two gripping heads to release the jaws 49 and to make it possible to easily remove the pieces of the test coupon.

While I have described a preferred embodiment of my invention it is obvious that other embodiments and constructions may be adopted without departing from the spirit of my invention. Therefore, I desire not to be limited by the foregoing description but solely by the appended claim.

What is claimed is:

A measuring head for a spot weld coupon testing device comprising a resilient restraining means, means for transmitting movement from a gripping head of said device to said restraining means, means for indicating the deflection of said restraining means, and means for retaining a reading of said indicating means, said last mentioned means comprising a plunger for transmitting movement from said restraining means to said indicating means, said plunger having a tapered notch therein and a friction pin resting in said notch and being urged against the tapered surface, and means for manually releasing said pin from said tapered surface to restore the indicating means to normal.

FRASER B. JACOB.

REFERENCES CITED

The following references are of record in the file of this patent:

UNITED STATES PATENTS

| Number | Name | Date |
|---|---|---|
| 308,659 | Emery | Dec. 2, 1884 |
| 1,098,102 | Elmer | Mar. 26, 1914 |
| 1,255,936 | Scott | Feb. 12, 1918 |
| 1,422,576 | Humpheys | June 11, 1922 |
| 1,512,491 | Scott | Oct. 21, 1924 |
| 1,657,261 | Iler | Jan. 24, 1928 |
| 1,696,148 | Camp | Dec. 18, 1928 |
| 1,770,045 | Shore et al. | July 8, 1930 |
| 2,001,711 | Dinzl | May 21, 1935 |
| 2,004,660 | Hounsfield | June 11, 1935 |
| 2,065,359 | Zechmeister | Dec. 22, 1936 |
| 2,090,160 | Spitzglass et al. | Aug. 17, 1937 |
| 2,283,707 | Sturtevant | May 19, 1942 |

FOREIGN PATENTS

| Number | Country | Date |
|---|---|---|
| 348,026 | Italy | May 5, 1937 |